United States Patent
Craigie

(10) Patent No.: US 8,209,538 B2
(45) Date of Patent: Jun. 26, 2012

(54) EMAIL POLICY MANAGER

(75) Inventor: Jim Craigie, Berkshire (GB)

(73) Assignee: Clearswift Limited, Berkshire (GB)

( * ) Notice: Subject to any disclaimer, the term of this patent is extended or adjusted under 35 U.S.C. 154(b) by 616 days.

(21) Appl. No.: 10/568,451

(22) PCT Filed: Aug. 16, 2004

(86) PCT No.: PCT/GB2004/003541
§ 371 (c)(1), (2), (4) Date: Nov. 14, 2006

(87) PCT Pub. No.: WO2005/020527
PCT Pub. Date: Mar. 3, 2005

(65) Prior Publication Data
US 2007/0168666 A1    Jul. 19, 2007

(30) Foreign Application Priority Data
Aug. 18, 2003  (GB) .................................. 0319363.8

(51) Int. Cl.
*H04L 9/32* (2006.01)

(52) U.S. Cl. ........ 713/176; 713/150; 713/151; 713/153; 713/154; 713/173; 713/170; 709/207; 709/230; 709/225; 709/206; 726/4; 726/11; 726/14; 726/26

(58) Field of Classification Search .................. 713/176
See application file for complete search history.

(56) References Cited

U.S. PATENT DOCUMENTS

| | | | |
|---|---|---|---|
| 4,405,829 A | 9/1983 | Rivest et al. | |
| 5,555,346 A * | 9/1996 | Gross et al. | 706/45 |
| 5,889,943 A | 3/1999 | Ji et al. | |
| 5,943,426 A | 8/1999 | Frith et al. | |
| 5,956,408 A | 9/1999 | Arnold | |
| 6,085,321 A | 7/2000 | Gibbs et al. | |
| 6,356,935 B1 | 3/2002 | Gibbs | |
| 6,393,464 B1 | 5/2002 | Dieterman | |
| 6,643,684 B1 * | 11/2003 | Malkin et al. | 709/206 |
| 2002/0007453 A1 | 1/2002 | Nemovicher | |
| 2002/0181703 A1 * | 12/2002 | Logan et al. | 380/30 |
| 2003/0135737 A1 | 7/2003 | Bouthors | |

(Continued)

FOREIGN PATENT DOCUMENTS

WO    WO 00/10288    2/2000

(Continued)

OTHER PUBLICATIONS http://www.tumbleweed.com/en/repos/2199-MMS Brochure.pdf, Tumbleweed MMS (Messaging Management System), Tumbleweed Communications, last modified May 28, 2003.

(Continued)

*Primary Examiner* — Nathan Flynn
*Assistant Examiner* — Bryan Wright
(74) *Attorney, Agent, or Firm* — Alston & Bird LLP

(57) ABSTRACT

An email policy is applied in a policy manager, running on a mail server in a local area network, to determine whether an outgoing email message should be allowed to be transmitted to a destination address outside the local area network, for example over the internet. A digital signature is used in the policy manager, to determine if the sender is the sender indicated in the message itself. If so, a sender-dependent policy is applied.

15 Claims, 2 Drawing Sheets

U.S. PATENT DOCUMENTS

2003/0163540 A1* 8/2003 Dorricott ............... 709/206
2004/0111519 A1* 6/2004 Fu et al. ............... 709/229
2005/0080914 A1* 4/2005 Lerner et al. ........... 709/230

FOREIGN PATENT DOCUMENTS

| WO | WO 01/37496 A1 | 5/2001 |
| WO | WO 03/001326 A2 | 1/2003 |

OTHER PUBLICATIONS

"Cryptography: A Guide for the Design and Implementation of Secure Systems", by Carl H. Meyer and Stephen M. Matyas, ISBN 0-471-04892-5, Wiley (1982).

New Directions in Cryptography IEEE Trans.Inf. Theory Diffie et al. IT-22 pp. 644-654 (1976).

"sendmail", by Bryan Costales, Eric Allman and Neil Rickert, ISBN 1-56592-056-2, O'Reilly (1993) pp. 243-244.

* cited by examiner

EMAIL POLICY MANAGER

This invention relates to an email policy manager, for use in an email system. More particularly, the invention may be applied to a boundary agent, and a method used therein, for applying email policy.

Email is a convenient way for computer users to communicate, and in particular provides a very convenient way for a computer user to transmit data to another computer user.

However, this very convenience means that it is important for an organization to be able to carry out at least some forms of monitoring of emails sent from the organization. For example, emails may be used to send confidential information to unauthorized recipients outside the organization. As another example, emails may be used to send attachments in the form of program executables. This can lead to another difficulty arising from the use of email, namely the spread of computer viruses, which may be sent as executable file attachments to emails.

Many of these problems are solved to a large extent by the use of email manager software, that is, a software application which is provided on a local area network (LAN), and monitors emails. In particular, a boundary agent is a software application, which is provided on a local area network (LAN) having an internet connection, and monitors emails being sent over the internet by users connected to the LAN.

The boundary agent can then detect emails whose attachments may contain viruses. Similarly, the boundary agent can detect emails whose content is suspicious. For example, emails containing specific key words can be regarded as suspicious. Also, emails having large attachments, or specific filetypes as attachments, can be regarded as suspicious.

Suspicious emails can be blocked, or they can be quarantined, that is, they are not transmitted at least until they have been reviewed. The rules, which are set up by the organization to determine which emails are treated as suspicious, are termed an "email policy".

Examples of boundary agents are products in the MIMESweeper® range from Clearswift Corporation.

One feature of boundary agents is that they can allow the email policy to be user-dependent. In particular, considering the application of the boundary agent to monitoring outgoing emails, the rules, which determine which emails are treated as suspicious, can vary from one user to another.

For example, while some personnel within an organization may be expected to send emails dealing with a particular subject, other personnel may not be expected to send emails dealing with that subject. In that case, emails containing key words relating to that subject may be treated as suspicious if they are sent by personnel within the second group.

Similarly, while some personnel within an organization may be expected to send emails with attachments of specific types, such as spreadsheets or image files, other personnel may not be expected to send emails having such attachments. In that case, emails having that type of attachment may be treated as suspicious if they are sent by personnel within the second group.

WO03/001326 discloses an email policy engine, which receives a message, and then determines from the sender which policy to apply to that message. Depending on the identity of the sender, the policy may determine whether or not a digital signature on the email should be verified.

Boundary agents applying such user-dependent email policies use the "From" field in the email message to identify the sender of the message, and then determine the rules which are to be followed for that user's messages.

However, this has the disadvantage that the content of the "From" field is no guarantee of the identity of the sender of the message. For example, a desktop email creating program may allow a user to create multiple accounts, and to complete the "From" field at will when creating such accounts. In this way, it becomes possible that, if a user knows the content of the "From" field in messages sent by another user, he can enter the same content in the "From" field of his own outgoing messages. The user is then subject not to the intended email policy, but to the email policy which applies to the other user.

WO01/37496 discloses an alternative email policy manager. In this system, depending on the identity of the sender, the policy may determine whether or not to add a digital signature to the email and whether or not to encrypt the message. Again, the system uses the "From" field in the email message to identify the sender of the message, and then determines the policy to be applied on that basis. However, again as mentioned above, the content of the "From" field can be forged, and is no guarantee of the identity of the sender of the message.

It is known in other circumstances that digital signatures can be used to identify the sender of email messages. For example, U.S. Pat. No. 5,956,408 describes a method for distributing data, in which data is encrypted using a private key of the data sender, and digitally signed by the sender. The recipient decrypts the encrypted data, using a public key of the data sender, and verifies the digital signature. If the digital signature is verified, the decrypted data is enabled for use.

However, as in the example given above, digital signatures are typically used only by a recipient of a message to confirm the identity of the sender or the validity of the message, after the message has been transmitted across a network.

Somewhat similarly, U.S. Patent Application No. 2003/0135737 discloses a system for use by a service provider, in which the service provider determines whether to forward a received message, based on verifying the signature in the message.

By contrast, according to an aspect of the present invention, there is provided a method of applying an email policy to determine whether a message should be allowed to be transmitted from a local area network across a wide area network. The method according to the present invention applies a sender-dependent policy, using a digital signature to identify the sender of a message.

This has the advantage that the digital signature allows the sender to be identified with a high degree of certainty, so that the sender-dependent policy can be applied correctly.

According to another aspect of the present invention, there is provided a computer program product containing code for performing the method.

For a better understanding of the present invention, and to show how it may be put into effect, reference will now be made, by way of example, to the accompanying drawings.

Figure 1:
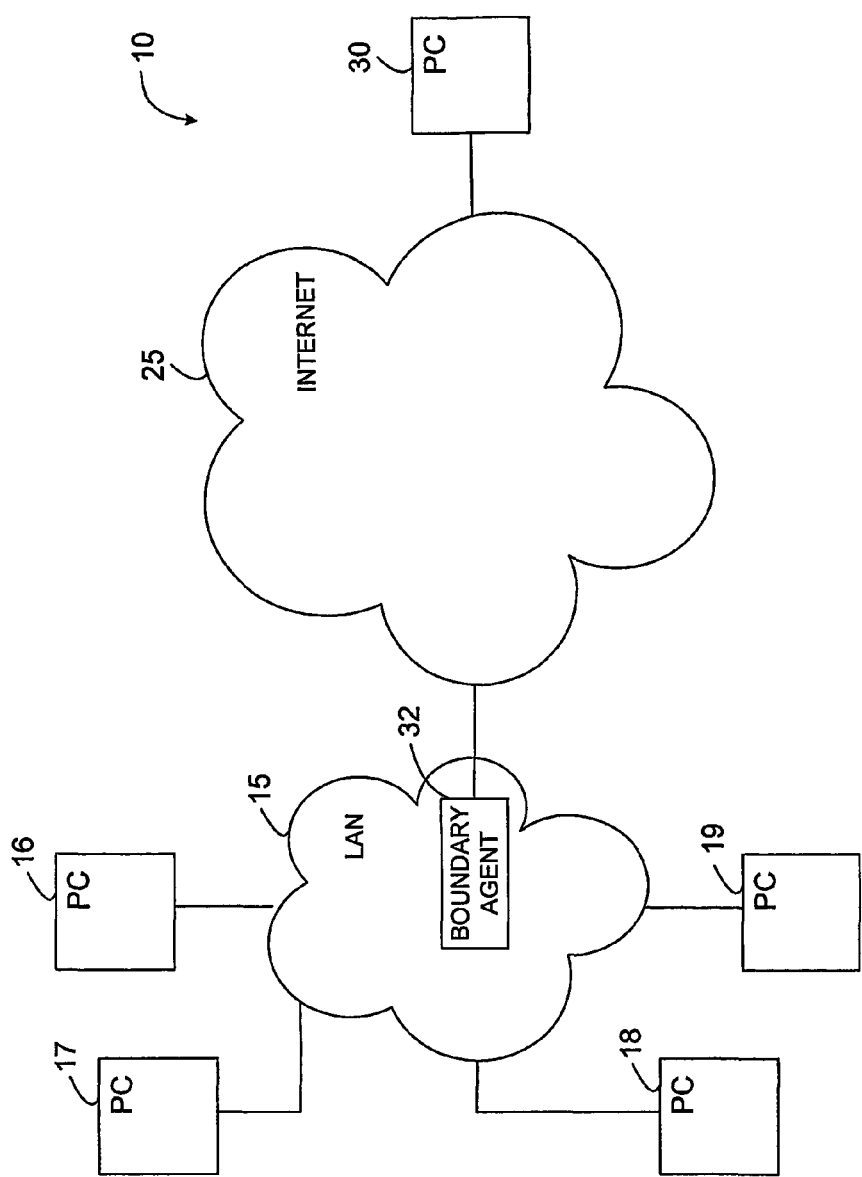
FIG. 1 is a block schematic diagram of a computer network.

FIG. 1 shows a computer network 10, which includes a local area network (LAN) 15, having personal computers (PCs) 16, 17, 18, 19 connected to it. The LAN has a connection to a wide area network (WAN) 25, which in this illustrated embodiment is the internet. Also shown connected to the internet 25 is a further personal computer (PC) 30. It will be appreciated that a real computer network is very much more complex than that illustrated, but the network shown in FIG. 1 is sufficient to illustrate and explain the present invention.

One common use of a computer network, such as that shown in FIG. 1, is to transmit electronic mail messages. For example, the user of one of the personal computers 16-19 can transmit electronic mail messages to the user of the personal computer 30. Such messages can contain text alone, or they can have attachments in the form of computer files.

As shown in the FIG. 1, the local area network 15 includes a boundary agent 32, which takes the form of software running on a mail server (not shown) in the network 15. The boundary agent 32 inspects the email traffic, which is intended to be transmitted over the internet 15. For example, the boundary agent 32 automatically checks mail messages for viruses.

In addition, the boundary agent 32 applies a sender-dependent email policy. Thus, while some personnel within an organization, that is, some users of personal computers 16-19, are permitted to send emails with attachments of specific types, such as spreadsheets or image files, other personnel are not permitted to send emails having such attachments. The boundary agent 32 can be generally conventional, and will therefore not be described further herein, except as required for an understanding of the present invention.

Figure 2:
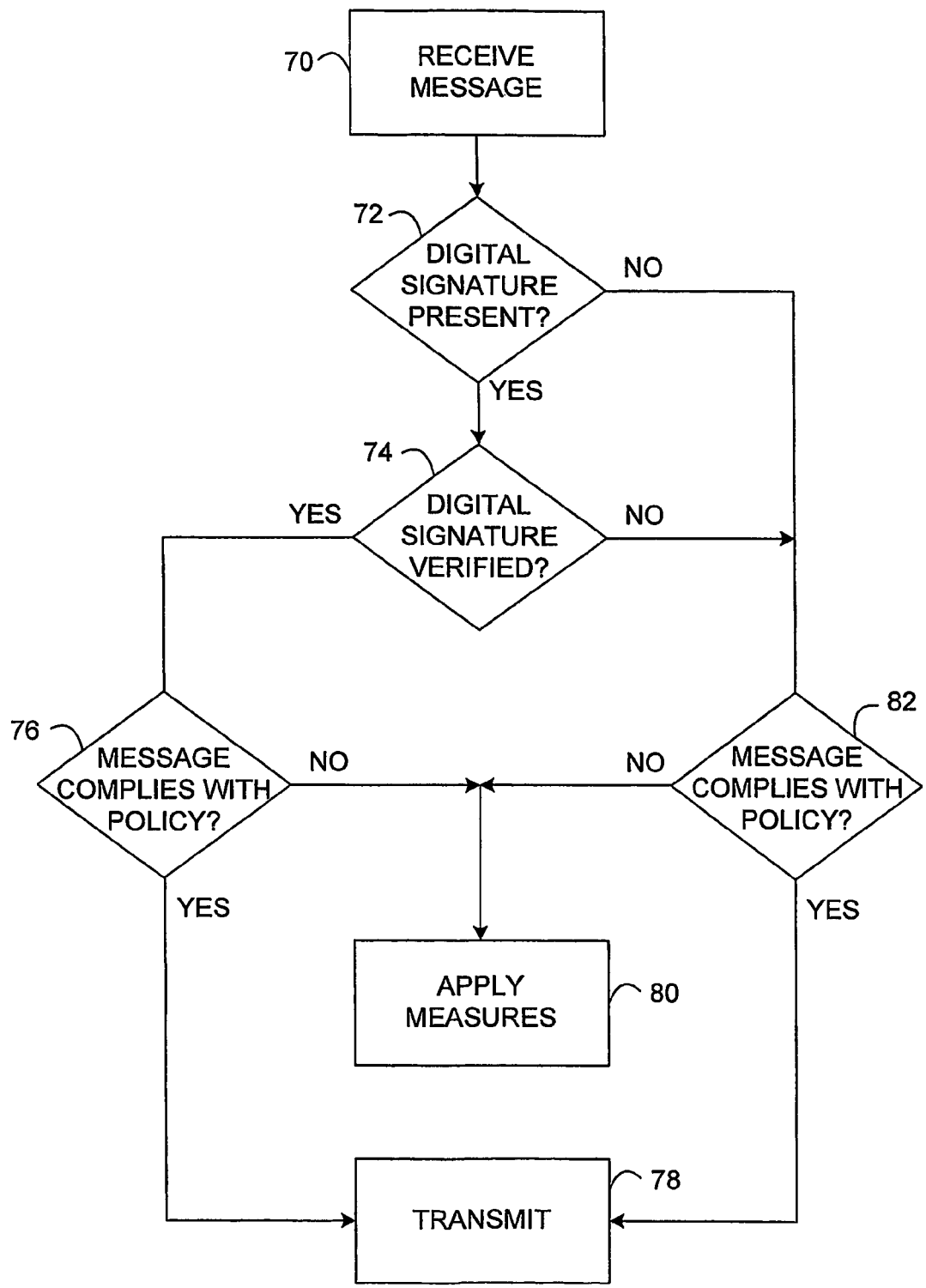
FIG. 2 is a flow chart, illustrating a method according to the present invention.

FIG. 2 is a flow chart, showing a method performed by the boundary agent in accordance with the present invention.

In step 70, the boundary agent 32 inspects a mail message, which has been transmitted from one of the personal computers 16-19, intended for an external computer user, for example a user of the computer 30.

In step 72, the boundary agent 32 determines whether the message contains a digital signature and, if so, the boundary agent 32 determines in step 74 whether the digital signature can be verified.

A digital signature is a code which can be incorporated in an electronic mail message in order to identify the sender of the message. Conventional desktop email creating programs incorporate a feature allowing a digital signature to be added. As is known in the art, an infrastructure must be provided to allow the verification of digital signatures, and this will not be described in detail herein. Briefly, it is possible to verify a digital signature by checking with a Certification Authority, which maintains (either directly or indirectly) a list of valid digital signatures and the identities of the associated users.

If it is determined in step 72 that the message contains a digital signature, and if the digital signature is verified in step 74, the process passes to step 76. It should be noted that the verification of the digital signature may also confirm that the message has not been compromised during transport.

In step 76, the process applies a sender-specific email policy. That is, having extracted the purported identity of the user from the message, and having verified that the digital signature applies to the same user, the boundary agent 32 determines whether the message, and any attachments, comply with an email policy which is specific to the user identified in the message. For this purpose, the boundary agent 32 maintains a list of users, and the respective email policies which are to be applied to messages sent by those users.

For example, while some users of the personal computers 16-19 may be expected to send emails dealing with a particular subject, other users may not be expected to send emails dealing with that subject. In that case, emails containing key words relating to that subject do not comply with the sender-specific email policy, if they are sent by personnel within the second group.

Similarly, while some users of the personal computers 16-19 may be expected to send emails with attachments of specific types, such as spreadsheets or image files, other users may not be expected to send emails having such attachments. In that case, emails having that type of attachment do not comply with the sender-specific email policy, if they are sent by users within the second group.

If it is determined in step 76 that the message complies with the sender-specific email policy, the process passes to step 78, and the message is allowed to be transmitted over the internet 25. By contrast, if it is determined in step 76 that the message does not comply with the sender-specific email policy, the process passes to step 80, and appropriate measures are applied.

For example, the message may be blocked, with or without notification to the sender, or may be quarantined for review by IT personnel responsible for operation of the local area network 15, or, in the case where it is an attachment which causes non-compliance with the email policy, the message may be transmitted without the attachment.

If it is determined in step 72 that the message does not contain a digital signature, or if is determined in step 74 that the digital signature is not verified, the process passes to step 82.

In step 82, the process applies a default email policy. The default email policy tests for specific keywords in messages, and for specific filetypes as attachments, in the same way as the sender-specific email policies described above. However, it is typically more restrictive in all respects than the sender-specific email policies applied to messages with verified digital signatures. That is, the default email policy may have a longer list of keywords which mark a message as non-compliant, or may regard more different filetypes as non-compliant.

If it is determined in step 82 that the message complies with the default email policy, the process passes to step 78, and the message is allowed to be transmitted over the internet 25, as described above. If it is determined in step 82 that the message does not comply with the default email policy, the process passes to step 80, and appropriate measures are applied, again as described above.

As mentioned above, the default email policy is typically more restrictive in all respects than the sender-specific email policies applied to messages with verified digital signatures. Indeed, the default email policy may be such that no messages can comply with it. That is, all messages are rejected, unless they contain a verified digital signature.

It is also possible to define a variable default email policy. For example, a message without a digital signature may result from a simple omission. On the other hand, a message with a digital signature which does not match the purported sender identified in the message itself may be the result of a deliberate attempt to circumvent security procedures. Messages in these two categories may therefore be treated differently.

It is also possible to define a user-specific default email policy. For example, in the event that a message from one user or one of a group of users fails to include a verified digital signature, that message could be handled differently from a situation in which a message from another user or one of another group of users fails to include a verified digital signature.

The invention has been specifically described above with reference to its application in a boundary agent, to determine whether an email message can be transmitted across a boundary, for example to determine whether an email message can be transmitted outside a corporate local area network. However, it will be appreciated that the same method can be applied at any point in a network, for example within a local area network, to determine whether an email message can be further transmitted.

There is therefore disclosed a method of applying a sender-specific email policy based on a digital signature attached to an email message, to determine whether it should be transmitted further over a network.

The invention claimed is:

1. A method of applying a sender-specific mail policy, the method comprising:
    maintaining a list of computer system users and associated sender-specific mail policies associated with each of said computer system users, each of said sender-specific mail policies indicating at least one of how and whether a user message, received from one of said computer system users, is to be further transmitted across a network;
    receiving a mail message intended for further transmission across said network, said mail message indicating a sender thereof;
    determining whether said mail message contains a digital signature;
    attempting to verify said digital signature in said mail message;
    after said digital signature is verified, said mail message is determined to contain a verified digital signature,
    after a user corresponding to said verified digital signature is determined to correspond to said sender indicated in said mail message, applying to said mail message at least one of said sender-specific mail policies associated with said user; and
    after said mail message is not determined to contain said verified digital signature corresponding to said sender indicated in said mail message, applying a default mail policy to said mail message, wherein:
        said default mail policy indicates at least one of how and whether a sent message, received from a sender omitted from said list of computer system users, is to be further transmitted across said network; and
        said default mail policy is more restrictive than each of said sender-specific mail policies.

2. A method as claimed in claim 1, wherein the step of applying at least one of said sender-specific mail policies comprises determining whether said mail message complies with said at least one of said sender-specific mail policies;
    after determining said mail message does comply with said at least one of said sender-specific mail policies, allowing transmission of said mail message; and
    after not determining said mail message complies with said at least one of said sender-specific mail policies, applying appropriate measures to said mail message.

3. A method as claimed in claim 1, wherein the step of applying said default mail policy to said mail message comprises determining whether said mail message complies with said default mail policy;
    after determining said mail message does comply with said default mail policy, allowing transmission of said mail message; and
    after not determining said mail message complies with said default mail policy, applying appropriate measures to said mail message.

4. A method as claimed in claim 1, wherein said default mail policy is triggered by more criteria than each of said sender-specific mail policies.

5. A method as claimed in claim 1, wherein the step of applying said default mail policy to said mail message comprises rejecting said mail message.

6. A method as claimed in claim 1, comprising receiving the mail message in a boundary agent, the mail message being intended for further transmission over an external computer network.

7. A local computer network, comprising:
    a plurality of user computers;
    a mail server; and
    at least one connection to a second computer network, such that outgoing mail messages are sent from said user computers to destination computers connected to said second computer network, and such that incoming mail messages are sent to said user computers from transmitting computers connected to said second computer network,
    wherein said mail server maintains a list of users of said user computers and respective sender-specific mail policies associated with each of said users, each of said sender-specific mail policies indicating at least one of how and whether a mail message, received from one of said computer system users, is to be further transmitted across said second computer network;
    wherein, after said mail server receives an outgoing mail message, said outgoing mail message indicating a sender thereof, said mail server is configured to determine whether said outgoing mail message contains a digital signature and, if so, is configured to attempt to verify said digital signature in said outgoing mail message; and
    after said digital signature is verified, said outgoing mail message is determined to contain a verified digital signature,
    after a user corresponding to said verified digital signature is determined to correspond to said sender indicated in said outgoing mail message, said mail server is configured to apply to said outgoing mail message at least one of said sender-specific mail policies associated with said user, and
    after said outgoing mail message is not determined to contain said verified digital signature corresponding to said sender indicated in said outgoing mail message, said mail server is configured to apply a default mail policy to said outgoing mail message, wherein:
        said default mail policy indicates at least one of how and whether a mail message, received from a sender omitted from said list of users, is to be further transmitted; and
        said default mail policy is more restrictive than each of said sender-specific mail policies.

8. A local computer network as claimed in claim 7, wherein, after said mail server determines whether said outgoing mail message complies with at least one of said sender-specific mail policies:
    after determining said outgoing mail message does comply with at least one of said sender-specific mail policies, said mail server is configured to allow transmission of said outgoing mail message; and
    after not determining said outgoing mail message complies with at least one of said sender-specific mail policies, said mail server is configured to apply appropriate measures to said outgoing mail message.

9. A local computer network as claimed in claim 7, wherein, when said mail server is configured to determine whether said outgoing mail message complies with said default mail policy:

after determining said outgoing mail message does comply with said default mail policy, said mail server is configured to allow transmission of said outgoing mail message; and after not determining said outgoing mail message complies with said default mail policy, said mail server is configured to apply appropriate measures to said outgoing mail message.

10. A local computer network as claimed in claim 7, wherein said default mail policy is triggered by more criteria than each of said sender-specific mail policies.

11. A local computer network as claimed in claim 7, wherein said default mail policy is to reject said outgoing mail message.

12. A computer program product on a non-transitory storage medium of a mail server in a local computer network, said local computer network further comprising:

a plurality of user computers; and at least one connection to a second computer network, such that outgoing mail messages are sent from said user computers to destination computers connected to said second computer network, and such that incoming mail messages are sent to said user computers from transmitting computers connected to said second computer network, wherein said computer program product is configured to cause said mail server to maintain a list of users of said user computers and respective sender-specific mail policies associated with each of said users, each of said sender-specific mail policies indicating at least one of how and whether a message, received from one of said computer system users, is to be further transmitted across said second computer network;

wherein, when said mail server receives an outgoing mail message, said outgoing mail message indicating a sender thereof, said computer program product is configured to cause said mail server to determine whether said outgoing mail message contains a digital signature and, if so, attempt to verify said digital signature in said outgoing mail message; and after said digital signature is verified, said outgoing mail message is determined to contain a verified digital signature, after a user corresponding to said verified digital signature is determined to correspond to said sender indicated in said outgoing mail message, said computer program product is configured to cause said mail server to apply to said outgoing mail message at least one of said sender-specific mail policies associated with said user, and after said outgoing mail message is not determined to contain said verified digital signature corresponding to said sender indicated in said outgoing mail message, said computer program product is configured to cause said mail server to apply a default mail policy to said outgoing mail message, wherein:

said default mail policy indicates at least one of how and whether a mail message, received from a sender omitted from said list of users, is to be further transmitted; and said default mail policy is more restrictive than each of said sender-specific mail policies.

13. A method as claimed in claim 1 further comprising, after said mail message is not determined to contain any digital signature corresponding to said sender indicated in said mail message, applying said default mail policy to said mail message.

14. A local computer network as claimed in claim 7 further comprising, after said outgoing mail message is not determined to contain any digital signature corresponding to said sender indicated in said outgoing mail message, said mail server is configured to apply said default mail policy to said outgoing mail message.

15. A computer program product as claimed in claim 12, wherein said local computer network further comprises being configured to, after said outgoing mail message is not determined to contain any digital signature corresponding to said sender indicated in said outgoing mail message, applying said default mail policy to said outgoing mail message.

* * * * *

UNITED STATES PATENT AND TRADEMARK OFFICE
CERTIFICATE OF CORRECTION

| | | |
|---|---|---|
| PATENT NO. | : 8,209,538 B2 | Page 1 of 1 |
| APPLICATION NO. | : 10/568451 | |
| DATED | : June 26, 2012 | |
| INVENTOR(S) | : Jim Craigie | |

It is certified that error appears in the above-identified patent and that said Letters Patent is hereby corrected as shown below:

Column 5

Line 9 "associated" should read --respective--

Signed and Sealed this
Eighteenth Day of September, 2012

David J. Kappos
*Director of the United States Patent and Trademark Office*